Patented Mar. 16, 1937

2,074,307

UNITED STATES PATENT OFFICE 2,074,307

PROCESS FOR THE PREPARATION OF ANTHRAQUINONEDISULPHONIC ACIDS

Myron S. Whelen, Milwaukee, Wis., assignor to E. I. du Pont de Nemours & Company, Wilmington, Del., a corporation of Delaware No Drawing. Application June 24, 1936, Serial No. 87,118

3 Claims. (Cl. 260—57)

This invention relates to the preparation of anthraquinonesulphonic acids and more particularly to a new and improved process for isolating 2,6-anthraquinonedisulphonic acid directly from the sulphonation mass, free from isomeric bodies and other impurities.

In the preparation of 2,6-anthraquinonedisulphonic acid by the direct sulphonation of anthraquinone, large quantities of isomeric disulphonic acids as well as some monosulphonic acids are formed. It has heretofore been the practice to isolate the 2,6-anthraquinonedisulphonic acid as the alkali metal salt by fractional precipitation from the diluted sulphonation mass. While a relatively pure product can be obtained by this process, it is in the form of the alkali metal salt which can be converted to the free acid only with difficulty and at a great loss in yield of the desired product.

It has been found that in the preparation of 2,6-dichloroanthraquinone by direct chlorination of 2,6-anthraquinonedisulphonic acid soda salt, complete replacement of the sulphonic acid groups can be effected only in extraordinarily large dilutions due to the relative insolubility of the 2-chloro-6-anthraquinonesulphonic acid sodium salt. Because of the large volumes of water required the process is impractical for commercial use.

It has been found that 2,6-anthraquinonedisulphonic acid (free acid) can be converted to the 2,6-dichloroanthraquinone easily and in high yields by direct chlorination in relatively small volumes of water or dilute acids.

It is, therefore, an object of this invention to provide a process for preparing 2,6-anthraquinonedisulphonic acid in a form which can be readily converted to the 2,6-dichloroanthraquinone.

It is a further object to prepare 2,6-anthraquinonedisulphonic acid as the oxonium salt and to prepare the free sulphonic acid by the hydrolysis of the oxonium compound.

These objects are accomplished by diluting the sulphonation mass to from 87 to 100% sulphuric acid concentration, and agitating until all of the 2,6-disulphonic acid has precipitated. The temperature of the solution is preferably kept below 50° C. After filtering, the acid cake of the 2,6-anthraquinonedisulphonic acid oxonium salt may be hydrolyzed by washing or slurrying in 50–80% sulphuric acid, 20–30% hydrochloric acid or glacial acetic acid. The free sulphonic acid may be isolated by washing free from adhering acids with solvents in which the sulphonic acids are not soluble, and drying. It is a light greenish-yellow powder, readily soluble in water.

The following example is given to more fully illustrate the invention. The parts used are by weight.

Example 22 parts of ortho-benzoylbenzoic acid are dissolved in 38 parts of 65% oleum. Ring-closure to anthraquinone is accomplished by heating at 100° C. for 2½ hours. The mass is then heated to 150° C. and a temperature of 150–155° C. is maintained for a period of about six hours or until disulphonation is complete. It is then diluted with about 115 parts of 93% sulphuric acid. The mass is then stirred until a temperature of 35° C. is reached. The mass is then filtered on a stone filter, and the separated material is washed with about 10 parts of 93% sulphuric acid. If desired, a somewhat purer product may be obtained by stirring the acid cake as above obtained with an equal weight of concentrated sulphuric acid (90 to 100%) at 80–100° C. for about one hour, followed by filtration at 30° C.

The product so obtained which is considered to be the oxonium salt is a yellowish crystalline solid which when washed or slurried in more dilute acid is hydrolyzed to the free sulphonic acid which when isolated is a yellowish-gray crystalline solid readily soluble in water.

The final acid concentration should be kept between 87–100% to prevent any hydrolysis of the oxonium salt. Filtration of the diluted mass is preferably carried out at between 30 and 60° C. At temperatures below 30° the product suffers to some degree in purity, while at temperatures above 50° the yield of the product is reduced due to the slight solubility of the 2,6-anthraquinonedisulphonic acid.

The 2,6-anthraquinonedisulphonic acid may be prepared directly from the ortho-benzoylbenzoic acid as illustrated above, or by direct sulphonation of anthraquinone, the separation of the pure 2,6-disulphonic acid being in no way dependent upon the source of the anthraquinone used.

If desired the 2,7-anthraquinonedisulphonic acid may be separated as the alkali metal salt from the acid mother liquor by the usual salting procedure described in the prior art.

A very pure 2,6-anthraquinonedisulphonic acid alkali metal salt may be obtained by slurrying the free acid in a dilute alkali metal salt solution, the sodium salt being relatively insoluble in the dilute acid solution.

I claim:

1. In the process for preparing 2,6-anthraquinonedisulphonic acid, the step which comprises isolating it from the sulphonation mass in which it is formed, by bringing the sulphuric acid concentration of the solution to from about 87 to 100%, agitating the solution until complete separation has taken place and filtering off the precipitated oxonium compound.

2. In the process for preparing 2,6-anthraquinonedisulphonic acid, the steps which comprise isolating it from the sulphonation mass in which it is formed, by bringing the sulphuric acid concentration of the solution to from about 87 to 100%, agitating the solution until complete separation has taken place, filtering off the precipitated oxonium compound and hydrolyzing the oxonium compound to the free 2,6-anthraquinonedisulphonic acid.

3. In the process for preparing 2,6-anthraquinonedisulphonic acid, the step which comprises isolating it from the sulphonation mass in which it is formed, by bringing the sulphuric acid concentration of the solution to from about 87 to 100%, agitating the solution until complete separation has taken place and filtering off the precipitated oxonium compound, washing the precipitate with a diluted mineral acid to effect hydrolysis of the oxonium compound.

MYRON S. WHELEN.